United States Patent [19]
Ichiyanagi

[11] 3,888,594
[45] June 10, 1975

[54] EXPOSURE CONTROL COMPUTING CIRCUIT

[75] Inventor: Toshikazu Ichiyanagi, Tokyo, Japan

[73] Assignee: Canon Kabushiki Kaisha, Japan

[22] Filed: Sept. 18, 1973

[21] Appl. No.: 398,552

[30] Foreign Application Priority Data
Sept. 22, 1972 Japan.............................. 47-95307

[52] U.S. Cl.................................. 356/226; 354/60
[51] Int. Cl. ............................................. G01j 1/44
[58] Field of Search ...... 356/218, 223, 226; 354/23, 354/24, 29, 43, 50, 60

[56] References Cited
UNITED STATES PATENTS
3,587,421   6/1971   Ono et al............................ 356/218

*Primary Examiner*—Ronald L. Wibert
*Assistant Examiner*—F. L. Evans
*Attorney, Agent, or Firm*—Toren, McGeady and Stanger

[57] ABSTRACT

This invention provides an exposure control computing circuit comprising a bridge circuit having impedance elements incorporated in two arms thereof and a plurality of logarithmic-operating elements such as log diodes incorporated for series connection in each of the other two arms, and by-pass impedance elements arranged to be connected between the respective joints of the logarithmic-operating elements and the point of junction between the former impedance elements, the circuit being such that appropriate exposure values are derived in response to the former and latter impedances set for photographic informations.

5 Claims, 4 Drawing Figures

EXPOSURE CONTROL COMPUTING CIRCUIT

DETAILED EXPLANATION OF THE INVENTION

This invention relates to an exposure control computing circuit, and more particularly to an exposure control computing circuit capable of being set for a great number of photographic informations.

For the setting of circuit parameters to values representing photographic informations such as film sensitivity, shutter speed, effective aperture, scene luminance, etc. most of the conventional exposure determining circuits are constructed as comprising a bridge circuit of which variable resistances incorporated in the arms thereof are set to values dependent upon the photographic informations, and in some cases a diaphragm means located in front of a light-receiving element is associated therewith so that the size of the effective aperture is adjusted in accordance with an appropriate exposure value determined by the photographic informations to make correct exposure.

With recent development of photosensitive emulsions and the improved performance of optical components, however, the computing elements of the exposure determining circuit are required to be made responsive over the extended ranges of exposure factors such as ASA sensitivity, aperture value, as a result of which the ability of the conventional circuit restricts the ranges of selection of photographic informations inasmuch as the circuit design is made with variable resistors, mechanical diaphragm means and the like.

In general, exposure values and particularly aperture value F as an exposure parameter are derived based on the formula $F = K \cdot T \cdot B \cdot S$, wherein $T$ is a shutter speed, $S$ is the film sensitivity, $B$ is the scene luminance, and $K$ is constant. As is evident from the formula, it is necessary that the computing elements are arranged to effect multiplication of different input signals representing the photographic informations. However, the prior art circuit has such drawbacks that the input introducing procedure makes it very difficult to set photographic informations in the multiplied form, and moreover as the number of photographic informations increases, the complexity of the circuit and mechanical structure is increased.

In order to overcome such conventional drawbacks as described above, therefore, it is the object of the present invention to provide an exposure control computing circuit which can accommodate a great number of computing elements in order to introduce the corresponding number of input signals representing photographic informations at a time, and which is capable of deriving an exposure value as an output signal in the form of a product of the input signals.

The embodiments of the present invention will be explained herebelow with reference to the accompanying drawings, wherein.

Figure 1:
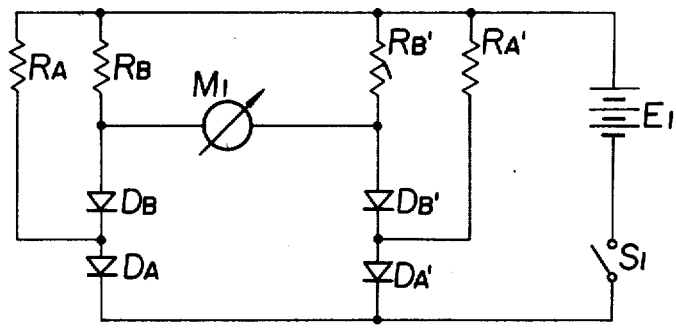
FIG. 1 is an electrical diagram of an exposure control computing circuit in the basic form of the present invention.

In FIG. 1 of the drawings is shown a bridge circuit comprising two resistance elements $R_B$, $R_{B'}$ incorporated in two arms thereof, and two pairs of diodes $D_A$, $D_B$ and $D_{A'}$, $D_{B'}$ having logarithmic compression characteristics incorporated for connection in forward direction in the other two arms. The junction between resistance elements $R_B$, $R_{B'}$ is connected to the positive terminal of a battery source $E_1$. One end of a resistance element $R_A$ of which the other end is connected to the joint of diodes $D_A$ and $D_B$, and one end of another resistance element $R_{A'}$ of which the other end is connected to the joint of diodes $D_{A'}$ and $D_{B'}$ also are connected to the junction above. The junction between diodes $D_A$ and $D_{A'}$ is connected through a battery switch $S_1$ to the negative terminal of the battery source $E_1$. An exposure indicating voltmeter $M_1$ is inserted for connection between the other two junctions between the respective resistance elements $R_B$, $R_{B'}$ and diodes $D_B$, $D_{B'}$.

Suppose that the resistance elements $R_A$, $R_B$, $R_{A'}$ and $R_{B'}$ are set to different values representing photographic informations, since the voltage $V$ between the terminals of a diode is generally defined by the function of current $i$, or $V = V_f + K \log i$, wherein $V_f$ and $K$ are constant, we have the following formulae for the voltages across the diodes $D_A$, $D_B$, $D_{A'}$ and $D_{B'}$.

$$V_A = V_f + K \log i_A \tag{1}$$

$$V_B = V_f + K \log i_B \tag{2}$$

$$V_{A'} = V_f + K \log i_{A'} \tag{3}$$

$$V_{B'} = V_f + K \log i_{B'} \tag{4}$$

From Eqs. (1) – (4), the voltage $V$ applied across the voltmeter $M_1$ is $$V = (V_A + V_B) - (V_{A'} + V_{B'}) = K \log \left( \frac{i_A \cdot i_B}{i_{A'} \cdot i_{B'}} \right)$$

If the circuit parameters of the resistance elements $R_A$, $R_B$, $R_{A'}$ and $R_{B'}$ are so chosen as $R_A << R_B$, and $R_{A'} << R_{B'}$, then the currents flowings through the resistance elements $R_A$ and $R_{A'}$ are almost equal to $i_A$ and $i_{A'}$ respectively. In addition, if all the diodes $D_A$, $D_B$, $D_{A'}$ and $D_{B'}$ have almost the identical characteristics, since the values $V_f$'s in Eqs. (1) – (4) are almost equal to one another, then $$i_A = \frac{E - V_f}{R_A}, \quad i_B = \frac{E - 2V_f}{R_B}, \quad i_{A'} = \frac{E - V_f}{R_{A'}}, \quad i_{B'} = \frac{E - 2V_f}{R_{B'}}$$

so that the above-defined voltage V becomes $$V = K \log R_{A'} \times R_{B'} \left(\frac{1}{R_A \times R_B}\right)$$

Therefore, applied to the voltmeter $M_1$ is a logarithmically compressed voltage expressed as a function of the product of the circuit parameters $R_A$, $R_{A'}$, $1/R_B$ and $1/R_{B'}$.

Figure 2:
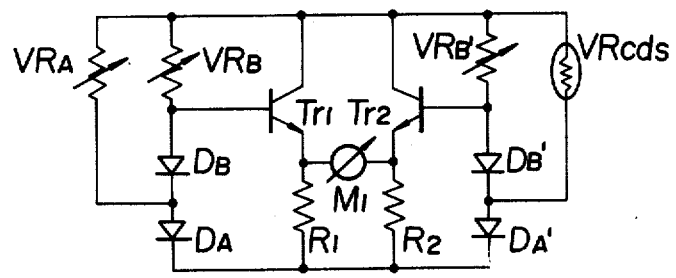
FIG. 2 is an electrical circuit diagram of one embodiment of the circuit shown in FIG. 1, adapted for an exposure control circuit of a camera.

FIG. 2 illustrates one embodiment of the basic circuitry shown in FIG. 1 adapted for use with an automatic control diaphragm device of a camera, wherein the needle of the voltmeter $M_1$ is interlocked with the diaphragm blades of known type not shown defining the area of opening of the aperture in accordance with the deflection of the needle. The voltmeter $M_1$ is arranged to be connected not directly but by way of transistors $Tr_1$ and $Tr_2$ between the joints of their respective emitter electrodes and emitter resistors $R_1$ and $R_2$. If the circuit parameters are so chosen that a variable resistor $VR_A$ inserted in the place of the resistance element $R_A$ is set to a value determined by the formula $K = 1/VR_A$, while a variable resistor $VR_B$ is set to a value determined by the formula $T = 1/VR_B$, and that the resistance $R_{CDS}$ of a photoconductive cell inserted in the place of said resistance element $R_A$ is set to a value determined by the formula $B = R_{CDS}$, while a variable resistor $BV_{RB'}$ is set to a value determined by the formula $S = RV_{RB'}$, then a voltage determined by the formula $V = K \log D\,T\,B\,S = K \log F$ is applied to the voltmeter $M_1$ so that the diaphragm device is automatically controlled in accordance with the deflection of the needle which indicates a correct aperture value.

Figure 3:
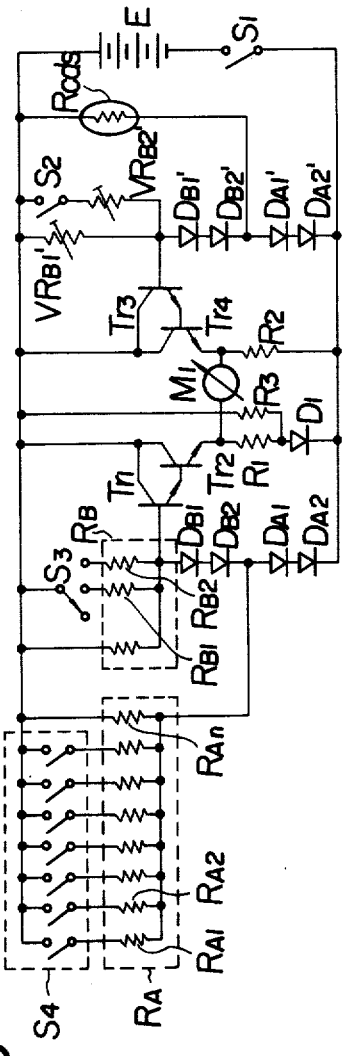
FIG. 3 is an electrical circuit diagram of another embodiment of the circuit shown in FIG. 1 adapted for an exposure control circuit of a cine camera.

In FIG. 3, the second embodiment of the computing circuit according to the present invention adapted to control a diaphragm control device of a cine camera is illustrated as a modification of the circuit shown in FIG. 2 in such a manner that the variable resistor $V_{RA}VR_A$ is replaced by an ASA setting resistance transferring circuit composed of a multiway switch $S_4$ and $n$ fixed resistors $R_{A1}$, $R_{A2}$, .... and $R_{An}$. Further, the variable resistors $VR_B$ and $VR_{B'}$ are replaced respectively by a flame frequency setter composed of a selector switch $S_3$ and two resistors $R_{B1}$ and $R_{B2}$ and a filter balancing setting consisting of two variable resistors $VR_{B1'}$ and $VR_{B2'}$ and a switch $S_2$ which is closed when a filter is attached to the front of the photographic lens. Each of the diodes $D_A$, $D_B$, $D_{A'}$ and $D_{B'}$ is replaced by a pair of diodes so that the withstand voltage of the diode arrangement is increased to withstand an increased voltage of the battery source. The voltmeter $M_1$ is connected through transistors $Tr_1$, $Tr_2$, $Tr_3$ and $Tr_4$ between the corners of the bridge circuit, the voltage $V'$ across the voltmeter $M_1$ being $$V' = 2K \log \frac{R_{CDS} \cdot VR_{B1'}}{R_A \cdot R_B}$$

which has the similar form to that defined above. An additional diode $D_1$ and resistor $R_2$ constitute a temperature compensating circuit.

Figure 4:
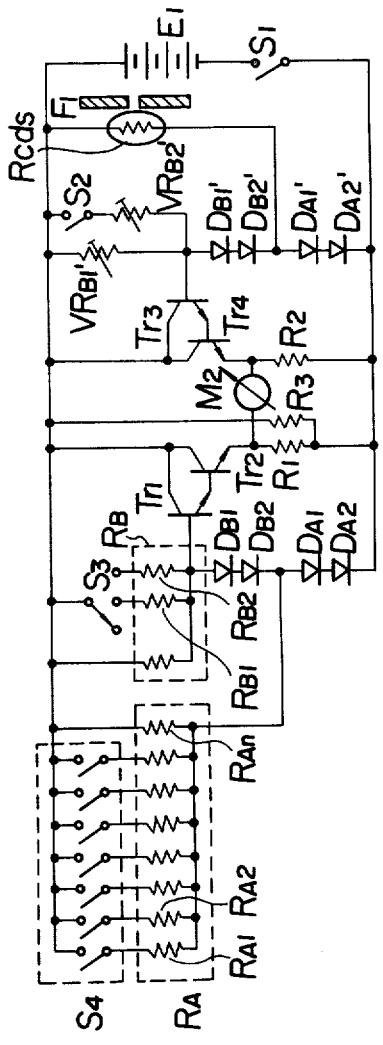
FIG. 4 is an electrical diagram of the embodiment shown in FIG. 3 with a modification.

The motion transmitting system which adjusts the size of the aperture of the diaphragm device as a function of the position of the needle of a meter $M_1$ may be replaced by a system in which the diaphragm device incorporated in the photographic lens is interlocked with a diaphragm means $F_1$ placed in front of the light-receiving photoconductive cell as shown in FIG. 4, so that the diaphragm device is controlled so as to align with '0' index mark the needle of a meter $M_2$, thereby the resultant size of the aperture of the diaphragm device is adjusted to a value dependent upon the photographic informations to effect correct exposure.

As will be seen from the foregoing description, an advantage of the present invention, deriving from the logarithmic compression of the input signals followed by a computation based on a specified function, is that it is possible to introduce wide ranges of photographic informations into the computing circuit by virtue of choise of only the circuit parameters, and another advantage, deriving from the employment of a bridge circuit as the basic circuit, is that the operation of the circuit can be stabilized against temperature variation, voltage fluctuation and loading variation.

The practice of the invention is not limited to the use of only one by-pass resistance element in each of the two arms incorporating diodes, although the embodiments are illustrated as such. If three or more diodes connected in series are employed along with two or more by-pass resistance elements connected to at least two joints of the diodes, the number of photographic informations to be set will be increased.

The embodiments are illustrated as directing the output of the bridge circuit to only a voltmeter. But it is to be understood that the output may be directed to memory condensers of an electric shutter, or other various output loadings of an exposure control system as well as the voltmeter. Further, the battery source $E_1$ may be replaced by an alternative power source. In this case, the resistance elements must be replaced by corresponding inductance elements or capacitance elements, of course.

What is claimed is:

1. An exposure control computing circuit capable of being set for photographic informations comprising:
   bridge circuit means constituting a bridge circuit, said bridge circuit means having
   a first and second impedance means incorporated in two arms of the bridge circuit, and
   a plurality of logarithmic-operating means incorporated in each of the other two arms of the bridge circuit,
   a third and fourth impedance means of which one ends are connected to said first and second impedance means, and the other ends are connected to joints of said logarithmic-operating means, and
   an exposure value determining means arranged to be connected between the output corners of the bridge circuit so that when at least two of the first to fourth impedance means are set for photographic informations, an exposure control parameter is derived as an output in the form of a product of the input signals representing the photographic informations to set said exposure value determining means connected between the output corners of the bridge circuit.

2. The exposure control computing circuit according to claim 1, wherein said first to fourth impedance means are composed of variable resistance means.

3. The exposure control computing circuit according to claim 1, wherein said logarithmic-operating means are log diodes.

4. The exposure control computing circuit according to claim 1, wherein at least one of said first to fourth impedance means is composed of
   a plurality of switch means of which the closure is made in response to the introduction of photographic informations,
   a plurality of fixed resistors connected in series to the said respective switch means, and
   leads connecting in parallel the series circuits each composed of a said switch means and a said fixed resistor.

5. The exposure control computing circuit according to claim 1, wherein said exposure value determining means is a galvanometer.

* * * * *